UNITED STATES PATENT OFFICE.

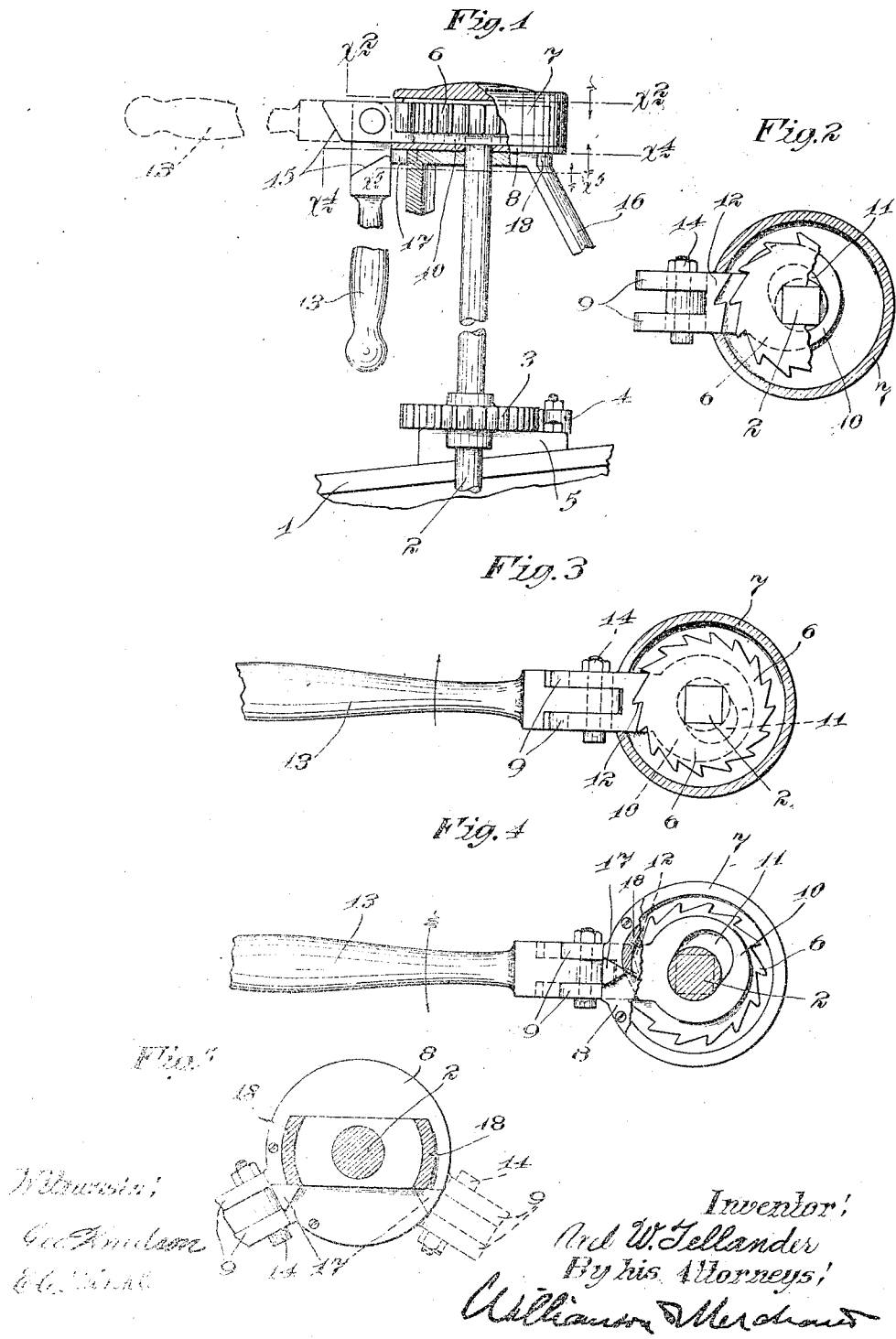

AXEL W. TELLANDER, OF ST. PAUL, MINNESOTA.

CAR-BRAKE-SETTING LEVER.

1,022,445.  Specification of Letters Patent.  Patented Apr. 9, 1912.

Application filed November 27, 1911. Serial No. 662,546.

*To all whom it may concern:*

Be it known that I, AXEL W. TELLANDER, a citizen of the United States, residing at St. Paul, in the county of Ramsey and State of Minnesota, have invented certain new and useful Improvements in Car-Brake-Setting Levers; and I do hereby declare the following to be a full, clear, and exact description of the invention, such as will enable others skilled in the art to which it appertains to make and use the same.

My invention has for its object to provide an improved brake setting lever for railway cars, and to such ends, generally stated, the invention consists of the novel devices and combinations of devices hereinafter described and defined in the claims.

Usually, a hand-wheel applied to the upper end of a vertical rod has been the device used for setting the brakes of railway cars. These hand-wheels have not had sufficient leverage therein to set the brakes on heavy cars.

My invention provides a lever and a coöperating ratchet wheel applied to the upper end of the brake rod or shaft, and this lever is made of considerable length, so as to afford great power in setting brakes, and is provided with a pivoted outer end section arranged to drop by gravity when released from the hand, and by its dropping movement, to automatically disconnect itself from the ratchet wheel which is secured to the upper end of said brake rod and moves therewith.

The invention is illustrated in the accompanying drawings wherein like characters indicate like parts throughout the several views.

Referring to the drawings, Figure 1 is a view chiefly in elevation, but with some parts sectioned, and some parts broken away, showing the improved lever and ratchet device applied to the upper end of the vertical brake-setting rod or shaft; Fig. 2 is a horizontal section taken on the line $x^2 \ x^2$ on Fig. 1; Fig. 3 is a view corresponding to Fig. 2, but showing the lever raised in an operative position; Fig. 4 is a view partly in bottom plan, and partly in horizontal section on the line $x^4 \ x^4$ on Fig. 1, the lever being shown as extended; and Fig. 5 is a horizontal section taken on the line $x^5 \ x^5$ on Fig. 1 looking upward.

The numeral 1 indicates the roof portion of an ordinary box car, and the numeral 2 indicates the vertical brake-setting rod or shaft provided just above the car roof with the ordinary or usual ratchet wheel 3.

The numeral 4 indicates the customary dog pivoted to a suitable support 5 on the roof of the car, and coöperating with the ratchet wheel 3 in the well known way to hold the brake set.

The numeral 6 indicates a ratchet wheel, which in accordance with my invention, is rigidly secured to the upper end of the brake rod 2 at the place where the hand-wheel is usually secured. This ratchet wheel 6 is located within a casing made up of a shell section 7 and a rigidly secured, but detachable bottom plate 8. This casing is loosely pivoted on the upper end of the rod 2, and at one point on its periphery is provided with an angular perforation through which projects the bifurcated outer end 9 of a ratchet lever 10. This ratchet lever 10 is a short member and within the casing is provided with an oblique cam slot 11, through which the upper end of the brake rod 2 is passed. The lever 10 is provided with one or more ratchet teeth 12 that are adapted to be engaged with and disengaged from the teeth of the ratchet wheel 6 by endwise radial movements of said lever. To the outer end of the lever 10, an extended handle 13 is pivotally connected, preferably by a short nutted bolt 14. Coöperating stop surfaces 15 on the said members 10 and 13 prevent the handle or outer lever section 13 from being raised higher than when in the horizontal position indicated by dotted lines in Fig. 1. When the handle 13 is raised, it will drop by gravity into a vertical position and its pivoted end is so related to the adjacent edge of the lower plate 8 of the casing 7 that when the said end piece thus drops by gravity, it will force the ratchet teeth 12 out of engagement with the teeth of the ratchet wheel 6. The slot 11, it will be noted, is oblique to the longitudinal axis of the operating levers 10 and 13 and is so arranged that whenever the operating lever is moved in the direction of the arrows marked thereon in Figs. 3 and 4, the said slot operating on the rod 2 will have a camming action that will draw the said operating lever radially inward and engage the teeth 12 thereof, with the teeth of the ratchet wheel 6. Preferably, the upper end portion of the brake setting rod 2 is supported by, and journaled in the upper portion of a bearing bracket 16 which will be secured in some suitable way to the top of the box car, when the device is applied to a car of this kind. It will, of course, be understood, however, that this improved brake lever is capable of general application to various different kinds of cars and will be found highly serviceable for use in connection with passenger coaches, in which latter application, the parts described would bear approximately the same relation to the car platform, which, in the drawings, they bear to the top of the box car.

It is desirable to limit the vibratory movements of the operating lever so that the said lever will always be found standing within a certain zone of movement. This may be conveniently done by providing the bottom plate 8 of the casing 7 with a depending stop lug 17 that works between and is engageable with circumferentially spaced stops 18 on the upper portion of the fixed bearing bracket 16.

The operation of the improved brake actuating device is probably made clear by the above description, but the following comments are pertinent: By the use of the operating lever having a pivoted outer end section which normally hangs by gravity close to the brake setting rod, it is made not only possible but practicable to have a quite long lever for use in the brake-setting action, and which, when not in use, will be out of the way. The proper engagement and disengagement between the ratchet wheel 6 and the teeth or dog carried by the operating lever, is controlled automatically, in the first instance, by the initial operating movement of the lever, and in the second instance, by the release and drop movement of the pivoted end of the lever. The brakes are adapted to be set by repeated oscillatory movements of the operating lever under sort of a ratchet-like action which does not require the lever to be moved through more than a small part of the complete rotation. When the brakes are to be released, it is only necessary first to drop the pivoted end or handle of the operating lever, which releases the said lever from the ratchet wheel 6, and then to complete the release of the brakes by kicking or otherwise forcing the retaining dog 4 out of engagement with the retaining ratchet wheel 3.

What I claim is:

1. In a brake-setting mechanism, the combination with a brake rod having a ratchet wheel, of a brake lever mounted for pivotal and radial movements in respect to said rod, operative on said ratchet wheel, and provided with a pivoted handle or outer end section which, when released, disengages said lever from said ratchet wheel by a radial movement.

2. In a brake-setting mechanism, the combination with a brake rod provided with a ratchet wheel, of a brake lever provided with a tooth engageable with said ratchet wheel and having an oblique cam slot through which said rod is passed, and a handle pivoted to the outer end of said lever, arranged to drop by gravity when released, and a part with which said lever engages when in normal position, to disengage said lever from said ratchet wheel.

3. In a brake-setting mechanism, the combination with a brake rod provided with a ratchet wheel, of a casing inclosing said ratchet wheel and pivoted on said rod, a lever projecting through one side of said casing, provided with an oblique slot through which said rod is passed and having a ratchet tooth for engagement with the teeth of said ratchet wheel, and a handle pivoted to the outer end of said lever adapted to drop by gravity when released, and normally engageable with an adjacent portion of said casing, to thereby disengage said lever from said ratchet wheel.

4. In a brake-setting mechanism, the combination with a brake rod provided with a ratchet wheel, of a casing inclosing said ratchet wheel and pivoted on said rod, a lever projecting through one side of said casing, provided with an oblique slot through which said rod is passed and having a ratchet tooth for engagement with the teeth of said ratchet wheel, a handle pivoted to the outer end of said lever adapted to drop by gravity when released, and normally engageable with an adjacent portion of said casing, to thereby disengage said lever from said ratchet wheel, a second ratchet wheel carried by said brake rod, and a retaining dog coöperating with said latter ratchet wheel, substantially as described.

5. In a brake-setting mechanism, the combination with a brake rod provided with a ratchet wheel, of a casing inclosing said ratchet wheel and pivoted on said rod, a lever projecting through one side of said casing, provided with an oblique slot through which said rod is passed and having a ratchet tooth for engagement with the teeth of said ratchet wheel, a handle pivoted to the outer end of said lever adapted to drop by gravity when released, and normally engageable with an adjacent portion of said casing, to thereby disengage said lever from said ratchet wheel, and a fixed bearing on said brake rod having stops limiting the oscillatory movements of said operating lever.

In testimony whereof I affix my signature in presence of two witnesses.

AXEL W. TELLANDER.

Witnesses:
MILDRED L. MUMMA,
HARRY D. KILGORE.